Patented Nov. 7, 1933

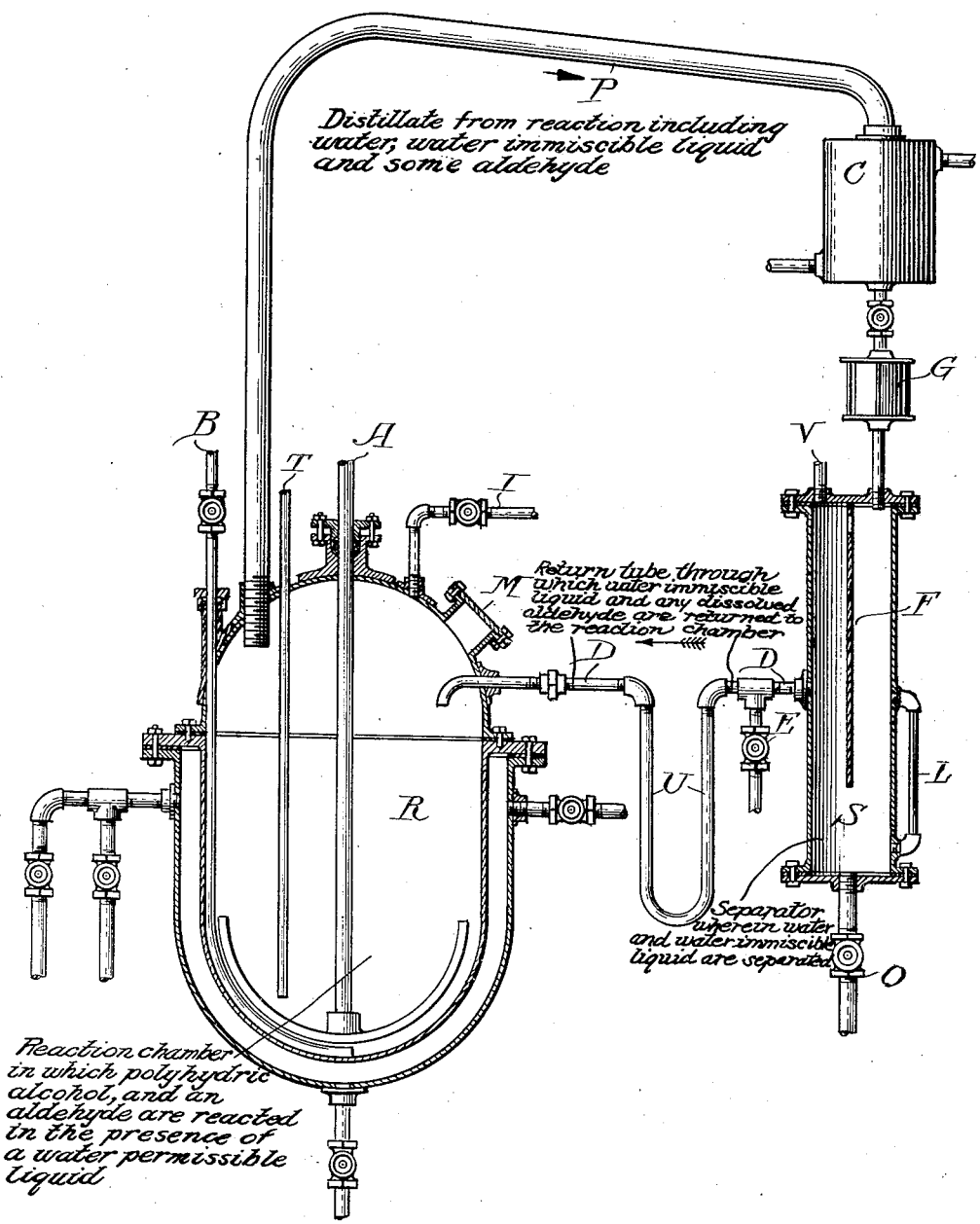

1,934,309

UNITED STATES PATENT OFFICE 1,934,309

CYCLIC ACETALS AND PROCESS OF PREPARING SAME

Kenneth H. Hoover, Chicago, Ill., assignor to Association of American Soap and Glycerine Producers, New York, N. Y.

Application October 21, 1927. Serial No. 227,639

11 Claims. (Cl. 260—54)

This invention relates to a new method of producing derivatives of glycerol and other polyhydric alcohols and to certain compounds produced by this method as well as to their adaptation to use in the industrial arts.

The condensation of certain polyhydric alcohols with certain of the aldehydes has been known to produce compounds which are called cyclic acetals. The various laboratory methods for producing these compounds are not suitable for commercial manufacture thereof, mainly because of the absence or inadequacy of means for removing the water, which is one of the products of the reaction.

An object of my invention is to accomplish the removal of this water in an efficient, economical and commercially feasible manner by the use of a water-immiscible liquid which does not take part in the reaction, and which distills with water, and is therefore adapted to act cyclically as a carrier for the removal of water from the reaction vessel.

It is an object of the invention to provide a process for condensing polyhydric alcohols with aldehydes, which consists in heating the aldehyde with a polyhydric alcohol, preferably but not necessarily in combining proportions, in the presence of a water-immiscible liquid which does not enter into the chemical reaction, but which distills with the water resulting from the reaction.

It is a further object of the invention to carry the reaction substantially to completion by removal of the water formed in the reaction by continuous distillation with and separation from the immiscible liquid.

The invention has as a further object the provision of a process, in which the operation is continuous, in that after the separation of the water from the immiscible liquid, the latter is again returned to the reaction vessel, except at the end of the reaction, when it is completely distilled off to remove the last traces of water and yield the acetal-like condensation product. Catalysts, such as sulphuric acd or other condensing agents, may be used, if desired.

It is an added object of the invention to control and maintain the temperature within certain established limits by the choice of the immiscible liquid employed to remove the water formed in the reaction.

In addition, it is also an object to prepare certain compounds of the class known as cyclic acetals, which have not been heretofore described, to wit: butal glycerol, furfural glycerol and furfural glycol.

It is another object of the invention to utilize the condensation product of the aldehydes and polyhydric alcohols of the class known as cyclic acetals to which the resultant compounds belong, as solvents or plasticizers in lacquer compositions.

It is a further object to also employ the cyclic acetals and combine therewith phenol or its homologues, or with phenol or its homologues and a polybasic acid or its anhydride to produce resinous products, either transparent or opaque.

The invention will be explained and more readily understood when used in conjunction with the accompanying drawing, which illustrates an apparatus which may be employed to assist in the accomplishment of the various objects herein referred to, it being obvious that changes and modifications may be resorted to in the structure, and also the process for producing the compounds without departing from the spirit of the invention, as defined in the claims forming a part hereof.

The present process for the condensation of polyhydric alcohols with aldehydes has notable advantages, in that it is capable of very wide application for the preparation of the cyclic acetals, and also, in that the reaction is capable of being carried to practical completion, using substantially combining proportions of the alcohol and aldehyde; thus resulting in a more efficient and economical procedure, which facilitates the recovery of the condensation product from the reaction mixture and tends to prevent the formation of those secondary reaction products which may result where an excess of aldehyde is used, particularly in the case of those aldehydes which oxidize readily.

As before stated, the process includes a means whereby the advantage of temperature control within limits may be simply accomplished merely by the choice of the immiscible liquid used to remove the water formed in the reaction. For example, the immiscible liquid may be benzene or toluene, or xylene, which distill with water at successively higher temperatures; thus making readily available a considerable range of operating temperatures. The particular immiscible liquids mentioned are especially well adapted to the process, because of their non-reactive character with respect to the reaction of the process. Many other liquids, however, such as petroleum hydrocarbons, may be used successfully and may in certain instances be preferable to those mentioned. It will be obvious, therefore, that the great variety of immiscible, non-reactive liquids available makes it possible by my process to carry out the condensation of polyhydric alcohols and aldehydes in each case at substantially the optimum temperature for the particular alcohol and aldehyde involved.

The process has much wider practical application than methods heretofore described. It is, for example, adaptable to the condensation of polyhydric alcohols with an aldehyde which boils below the boiling point of water, to wit: n-butyl aldehyde, boiling point 75.7° C., which is readily condensed, for example, with glycerol, using toluene to remove the water formed in the reaction. Although butyl aldehyde is volatilized with toluene and water during the reaction, it is miscible with toluene in all proportions and only slightly soluble in water. Therefore, after separation of the water from the distillate, the aldehyde returns to the reacting vessel with the toluene until the reaction is substantially completed.

My process proves, also, to be of wide application, in that it is further adaptable to the preparation of cyclic acetals from a polyhydric alcohol and a polymerized modification of the aldehyde. In this manner, for example, glycerol may be condensed with paraformaldehyde to yield formal glycerol.

Having described, in general, the process for the condensation of polhydric alcohols with aldehydes, the following is exemplary of the application of the process, it being understood that this example is descriptive rather than limiting. It will be understood, for example, that other polyhydric alcohols, such as ethylene glycol or other glycols, mannitol, erythritol, or derivatives of a polyhydric alcohol, as for example glycerol monochlorhydrin, may be used in the process. Various aldehydes may be used, as for example benzaldehyde and furfuraldehyde, or a polymerized modification of an aldehyde, as paraformaldehyde. Other liquids may serve the purpose of toluene, as for example, benzene, xylene and higher boiling coal tar or petroleum naphthas. Various other condensing agents, such as iodine, oxalic acid, or phosphoric acid, may replace sulphuric acid, or a condensation may be effected without a catalyst, this procedure being preferred when using an aldehyde which is unstable towards acids, as for example, furfuraldehyde. It is obvious that the process can, for example, be operated without the return of the water-immiscible liquid to the reaction vessel, and can be utilized successfully in many other modified forms without loss of the essential advantages of the invention.

The drawing illustrates an apparatus which may be employed to assist in practicing the invention, and includes a jacketed autoclave R, in which 920 parts of glycerol, 400 parts toluene and 3 parts sulphuric acid are charged. An agitator A operates in the autoclave and a riser pipe P, blow leg B, compressed air line I, man-hole M, and return delivery tube D communicate with the autoclave, within which a thermometer well T is also located. The charge is agitated and 720 parts of n-butyl aldehyde are run in. The reaction, which begins at once, is exothermic and the temperature rises. The reaction mixture is further heated by introducing steam into the jacket, which brings the mixture to the distilling temperature. The temperature of the reaction mixture will be about 90° C. at the beginning of the distillation, depending on the point to which the reaction has progressed, and the amount of water present as a result of the reaction that has taken place. The vapors are led through the riser pipe P to the water-cooled condenser C where they are condensed. The condensate then passes through the sight glass G to the separator S, which has a baffle F, sight gauge L and vent V. Two layers form in separator S a lower aqueous layer and a supernatant layer, consisting substantially of toluene, but with quite appreciable amounts of n-butyl aldehyde during the early stages of the reaction. During the reaction, the water separated in the separator S is drawn off at intervals through the outlet pipe O. When the liquid level in the separator S reaches the return delivery tube D, the toluene is automatically returned to the autoclave through the return line D, which is provided with trap U.

The heating and distillation are continued until substantially 180 parts of water have been collected in the separator S. The reaction temperature will normally have risen to about 120–125° C. at this point, at which time the reaction will be substantially complete.

Heating is now discontinued and the charge preferably, but not necessarily, cooled to 50–60° C. At this temperature, the reaction mixture is neutralized with substantially 5 parts of 50° Bé. sodium hydroxide solution. Litmus indicator may be used to determine neutrality. Heat is again applied until distillation begins. The return delivery line D to the autoclave is closed and the line E to the storage tank (not shown) opened. Distillation is continued until the greater portion of the toluene is removed to the storage tanks for use in subsequent runs and a small additional amount of water has been collected in the separator S.

The contents of the autoclave are now removed, being preferably blown by means of compressed air through the blow leg B, to a vacuum still (not shown) fitted with a fractionating column where the last traces of toluene are removed and the butal glycerol purified by methods well known to the art.

By my improved process, I have not only been able to prepare previously known cyclic acetals, but I have prepared three compounds not previously known, to wit: butal glycerol, furfural glycerol and furfural glycol, all of which have been prepared successfully by the process. Certain of the physical constants and properties of these new compounds are given below:

1. Butal glycerol, as produced by my process and after refractionation, is a colorless liquid of faint aromatic odor. It has a sharp burning taste, which persists for some time, somewhat like oil of cloves. It has a specific gravity of 1.054 at 20° C. It boils at 212–214° C. at atmospheric pressure and at 84–87° C. at 3 mm. absolute pressure. Butal glycerol is miscible with xylene in all proportions. It may be diluted with two or three volumes of water without turbidity.

2. Furfural glycerol, as produced by my process and after refractionation, is a yellowish liquid of faint odor and bitter burning taste. It has a specific gravity of 1.273 at 20° C. and is somewhat viscous, being comparable to glycerol in this respect. It boils, with decomposition, at 267–268° C. under atmospheric pressure and at 154–156° C. at 14 mm. pressure and at approximately 168° at 25 mm. It will dissolve an equal volume of water without turbidity. It is miscible with xylene in all proportions. It is readily soluble in alcohol and acetone, but less so in ether.

3. Furfural glycol, as produced by my process and after refractionation, is an almost colorless liquid of faint but characteristic odor. It is practically tasteless in the pure state, but produces a very sharp biting sensation on the tongue, which persists for some time. It has a specific gravity of 1.193 at 20° C. and boils at 197–197.5° C. at atmospheric pressure. It is only slightly soluble in water, but miscible with xylene or toluene in all proportions without turbidity. In contrast to the analogous glycerol derivative, it has little, if any, solvent action on cellulose nitrate or acetate.

It has been found that the condensation products of the aldehydes and polyhydric alcohols of the class known as cyclic acetals, to which class the three new compounds just described belong, are excellent solvents or plasticizers for use in lacquer compositions.

It has been found that the condensation products of polyhydric alcohols with aldehydes are, generally speaking, capable of entering into chemical combination with phenol or its homologues; or, with phenol or its homologues and a polybasic acid or its anhydride to yield resinous reaction products, both transparent and opaque, which are of value in the industrial arts.

As examples, furfural glycerol or furfural glycol, and more particularly, formal glycerol or formal glycol react with phenol or its homologues, when heated, to yield resinous products of varying physical properties. In the preferred procedure, an acid catalyst is used to effect the reaction,—sulphuric acid, even in very minute quantities in some cases, being particularly effective. For certain purposes, it is desirable to react chemically under heat one of these cyclic acetals with phenol or one of its homologues and a polybasic acid or its anhydride, thereby obtaining resinous reaction products of somewhat different physical and chemical properties. It may be desirable to use, instead of a single polybasic acid or its anhydride, a mixture of polybasic acids or their anhydrides, thereby further modifying the properties of the resinous reaction products. Of the polybasic acids which may be used, phthalic acid and succinic acid, or their anhydrides, are particularly suitable, but other polybasic acids may be used. In the preferred procedure, an acid catalyst, as, for example, sulphuric acid, is used.

The resinous reaction products formed by the chemical reaction of these cyclic acetals with phenol or its homologues, with or without the addition of a polybasic acid or its anhydride, exhibit varying degrees of solubility in organic solvents during different stages of the reaction, and may finally be carried by heat to varying degrees of infusibility and insolubility.

From the foregoing description of the process and product, it is manifest that the resultant condensation products of aldehydes and polyhydric alcohols, the cyclic acetals, are capable of use as solvents or plasticizers in lacquer compositions, and also that when combined with phenol or its homologues, or with phenol or its homologues and a polybasic acid or its anhydride, they produce resinous products, either transparent or opaque.

It is, also, evident that the process results in the advantage of commercially producing cyclic acetal compounds, which is one of the products of the reaction.

Having thus described the invention what I claim and desire to cover by Letters Patent is:

1. As a new composition of matter, a cyclic acetal having a furfural residue combined with a polyhydric alcohol residue produced by causing a polyhydric alcohol and furfuraldehyde to react to form said cyclic acetal and water, and removing the water from said mixture.

2. As a new composition of matter, a mixture comprising isomeric furfural glycerols.

3. A new composition of matter, the chemical compound furfural glycol.

4. The process of producing a cyclic acetal which comprises: causing a polyhydric alcohol and an aldehyde to react to form a cyclic acetal and water in the presence of a water-immiscible organic liquid, which is not reactive with said alcohol and aldehyde and a water mixture of which will distil from the reaction mixture at a reaction temperature, and distilling a mixture including the organic liquid and water from the reaction mixture.

5. The process of producing a cyclic acetal which comprises: causing a polyhydric alcohol and an aldehyde to react to form a cyclic acetal and water in the presence of a water-immiscible organic liquid, which is not reactive with said alcohol and aldehyde and a water mixture of which will distil from the reaction mixture at a reaction temperature, distilling a mixture including the organic liquid and water from the reaction mixture; and returning said organic liquid thereto after condensation and separation from the water.

6. The process of producing a cyclic acetal which comprises: causing a glycerol and an aldehyde to react to form a cyclic acetal and water in the presence of a water-immiscible organic liquid, which is not reactive with said alcohol and aldehyde and a water mixture of which will distil from the reaction mixture at a reaction temperature; and distilling a mixture including the organic liquid and water from the reaction mixture.

7. The process of producing a cyclic acetal which comprises: causing a polyhydric alcohol and furfuraldehyde to react to form a cyclic acetal and water in the presence of a water-immiscible organic liquid, which is not reactive with said alcohol and furfuraldehyde and a water mixture of which will distil from the reaction mixture at a reaction temperature, and distilling a mixture including the organic liquid and water from the reaction mixture.

8. The process of producing a furfural glycerol which comprises: causing a glycerol and furfuraldehyde to react to form a furfural glycerol and water in the presence of a water-immiscible organic liquid, which is not reactive with said glycerol and furfuraldehyde and a water mixture of which will distil from the reaction mixture at a reaction temperature; and distilling a mixture including the organic liquid and water from the reaction mixture.

9. The process of producing a furfural glycol which comprises: causing a glycol and furfuraldehyde to react to form a furfural glycol and water in the presence of a water-immiscible organic liquid, which is not reactive with said glycol and furfuraldehyde and a water mixture of which will distil from the reaction mixture at a reaction temperature, and distilling a mixture including the organic liquid and water from the reaction mixture.

10. The process of producing a cyclic acetal which comprises: causing a polyhydric alcohol and an aldehyde to react to form a cyclic acetal and water in the presence of a water-immiscible organic liquid, which is not reactive with said alcohol and aldehyde, and which has a substantial vapor pressure at a reaction temperature; and distilling a mixture including the organic liquid and water from the reaction mixture.

11. The process of producing a cyclic acetal which comprises: causing a polyhydric alcohol and an aldehyde to react in the presence of benzene; thereby forming a cyclic acetal and water, and distilling a mixture including the benzene and water from the reaction mixture.

KENNETH H. HOOVER.